(12) United States Patent
Carnevali

(10) Patent No.: US 7,975,971 B2
(45) Date of Patent: Jul. 12, 2011

(54) SUCTION CUP DEVICE

(76) Inventor: Jeffrey D. Carnevali, Seattle, WA (US)

( * ) Notice: Subject to any disclaimer, the term of this patent is extended or adjusted under 35 U.S.C. 154(b) by 834 days.

(21) Appl. No.: 11/600,008

(22) Filed: Nov. 15, 2006

(65) Prior Publication Data

US 2008/0111037 A1    May 15, 2008

(51) Int. Cl.
A45D 42/14    (2006.01)
(52) U.S. Cl. ............... 248/205.5; 248/205.8; 248/206.2
(58) Field of Classification Search ............... 248/205.5, 248/205.8, 206.2
See application file for complete search history.

(56) References Cited

U.S. PATENT DOCUMENTS

| | | | |
|---|---|---|---|
| 952,495 A | 3/1910 | Austin | |
| 1,871,113 A | 8/1932 | Compter et al. | |
| 2,047,658 A | 12/1935 | Zaiger | |
| 2,089,714 A | 8/1937 | Schuler | |
| 2,146,859 A | 2/1939 | Seklehner | |
| 2,542,101 A | 2/1951 | Suben | |
| 2,657,893 A | 11/1953 | Puckert | |
| 2,898,068 A | 8/1959 | Warren | |
| 2,939,585 A | 6/1960 | Burgin | |
| 2,940,713 A | 6/1960 | Van Dusen | |
| 3,765,638 A | 10/1973 | Harrison | |
| 3,863,568 A | 2/1975 | Fredrick | |
| 4,078,128 A | 3/1978 | Hoyt et al. | |
| 4,093,165 A | 6/1978 | Sussman | |
| 4,188,765 A | 2/1980 | Jackson | |
| 4,381,575 A | 5/1983 | Wendt | |
| 4,552,713 A | 11/1985 | Cavicchioli | |
| 4,580,794 A | 4/1986 | Gibbons | |
| 4,784,285 A | 11/1988 | Patel | |
| 4,885,121 A | 12/1989 | Patel | |
| 4,934,641 A | 6/1990 | McElhaney | |
| 5,029,786 A | 7/1991 | Wu | |
| 5,054,370 A | 10/1991 | Osterday et al. | |
| 5,059,271 A | 10/1991 | Taub | |
| 5,065,973 A | 11/1991 | Wang | |
| 5,087,005 A | 2/1992 | Holoff et al. | |
| 5,104,077 A | 4/1992 | Liu | |
| 5,187,744 A | 2/1993 | Richter | |
| 5,267,722 A | 12/1993 | Coulter | |
| 5,331,959 A | 7/1994 | Imran | |
| 5,381,990 A | 1/1995 | Belokin et al. | |
| 5,571,074 A * | 11/1996 | Buckman et al. | ............... 601/6 |
| 5,661,208 A | 8/1997 | Estes | |
| 5,992,806 A | 11/1999 | Adams | |
| 6,045,111 A | 4/2000 | Hsieh | |
| 6,083,122 A * | 7/2000 | Brown | ............... 473/401 |
| 6,136,039 A | 10/2000 | Kristinsson et al. | |
| 6,193,197 B1 | 2/2001 | Lian | |
| 6,478,271 B1 | 11/2002 | Mulholland | |
| 6,552,109 B1 | 4/2003 | Chen | |
| 6,666,420 B1 * | 12/2003 | Carnevali | ............... 248/205.8 |
| 6,840,639 B2 * | 1/2005 | Zadro | ............... 359/855 |

(Continued)

*Primary Examiner* — Korie Chan
(74) *Attorney, Agent, or Firm* — Charles J. Rupnick, Attorney at Law

(57) ABSTRACT

A suction cup holding device that effectively conforms to soft surfaces and complex curves which may be present in the target surfaces such as a dash board of a modern automobile. The suction cup device includes a housing having a recess therein with an opening formed in a first surface, wherein a first portion of the housing adjacent to the first surface is substantially flexible and a second substantially inflexible portion thereof is structured for mounting thereto; a low durometer suction cup having a resiliently deformable central portion that is structured to be drawn into the recess of the housing; and means for drawing the central portion of the suction cup into the recess.

21 Claims, 6 Drawing Sheets

U.S. PATENT DOCUMENTS

| | | |
|---|---|---|
| 6,881,209 B2 | 4/2005 | Boatman et al. |
| 6,932,306 B2 * | 8/2005 | Zou et al. .................. 248/205.5 |
| 7,008,452 B2 | 3/2006 | Hawkins |
| 7,264,197 B2 * | 9/2007 | Yu .............................. 242/597.7 |
| 2002/0100134 A1 * | 8/2002 | Dunn et al. ................. 15/167.1 |
| 2002/0119726 A1 * | 8/2002 | Wilk .............................. 446/92 |
| 2004/0143153 A1 * | 7/2004 | Sharrow .......................... 600/37 |
| 2008/0230662 A1 * | 9/2008 | Takahashi et al. ......... 248/206.2 |
| 2008/0245935 A1 * | 10/2008 | Kaneda et al. ............ 248/206.2 |

* cited by examiner

SUCTION CUP DEVICE

FIELD OF SEARCH

The present suction cup holding device relates to the field of suction cups, and in particular to suction cups structured to conform to non-planar surfaces.

BACKGROUND OF THE DEVICE

Suction cup devices are generally well-known and commonly used to mount and secure objects to smooth and generally planar target surfaces such as the surfaces of glass, plastic, Formica, glazed tile, metal, and other smooth surfaces. A typical suction cup device includes a suction cup body and a stem. The suction cup body is generally arcuate or circular and defines a concavity. Typically, the stem is integrally formed on the body and used as the place of attachment for the object to be supported by the suction cup device. At least the body of the suction cup is made of rubber, plastic or other material having sufficiently elastically resilient properties such that, when the body is pressed against a smooth and hard target surface, the volume of concavity is reduced, thereby forcing air to be expelled so that the suction cup body forms an air-tight seal against the smooth and hard target surface. A central portion of the suction cup body is drawn away from the target surface to increase the volume of the concavity and forming a vacuum therein. Atmospheric pressure outside the body retains the suction cup body against the target surface. When the air-tight seal is broken, air rushes into the concavity, releasing the vacuum and the suction attachment to the surface. Whereupon the elastically resilient material of the suction cup body returns to its relaxed condition. Typically, the resilient suction cup can be repeatedly reused.

One problem with known suction cup devices is suction cups are generally not able to form the air-tight seal unless the target surface substantially smooth and hard.

SUMMARY OF THE DESCRIPTION

The present suction cup holding device overcomes limitations of the prior art by providing a suction cup holding device that effectively conforms and seals to soft surfaces and complex curves which may be present in the target surfaces such as a dash board of a modern automobile.

According to one exemplary embodiment of the suction cup holding device, the suction cup holding device includes a housing having a recess therein with an opening formed in a first surface, wherein a first portion of the housing adjacent to the first surface is substantially flexible and a second substantially inflexible portion thereof is structured for mounting thereto; a low durometer suction cup having a resiliently deformable central portion that is structured to be drawn into the recess of the housing; and means for drawing the central portion of the suction cup into the recess.

According to another aspect of the suction cup holding device, the second substantially inflexible portion of the housing is positioned distal from the first surface.

According to another aspect of the suction cup holding device, the housing further includes a wall portion forming the recess and the opening in the first surface, a first portion of the wall portion adjacent to the first surface having a first relatively thinner cross-section; and the second substantially inflexible portion of the housing is formed having a second relatively thicker cross-section.

According to another aspect of the suction cup holding device, the housing is formed of a thermoplastic polyester elastomer.

According to another aspect of the suction cup holding device, the suction cup holding device further includes a suction cup drive shaft coupled to the central portion of the suction cup; and wherein the means for drawing the central portion of the suction cup into the recess further includes means for means for operating against the second substantially inflexible portion of the housing for moving the suction cup drive shaft relative thereto.

According to another aspect of the suction cup holding device, the second substantially inflexible portion of the housing is positioned distal from the first surface and substantially aligned with the opening therein and is formed with an aperture communicating with the recess and being sized to pass the suction cup drive shaft there through.

According to another aspect of the suction cup holding device, the suction cup further includes a substantially non-slip surface facing away from the housing.

According to another aspect of the suction cup holding device, the substantially non-slip surface of the suction cup further includes a plurality of micro-pores substantially distributed there across.

According to another aspect of the suction cup holding device, the suction cup holding device is further formed having compact axially-driven suction cup installation mechanism including a substantially rigid rotational drive mechanism having a tubular frame forming a substantially planar drive surface at one end thereof, a pair of diametrically opposed spiral installation drive members projecting inwardly from an internal wall surface of the tubular frame and being supported at first and second ends by a pair of diametrically opposed longitudinal stanchions projecting inwardly from the internal wall surface of the tubular frame, internal edge surfaces of the spiral installation drive members and longitudinal stanchions forming a longitudinal aperture axially aligned with the internal wall surface of the tubular frame, and means for manually rotating the tubular frame; a housing having a substantially planar external drive surface formed with an aperture therethrough and being structured to cooperate with the substantially planar drive surface of the rotational drive mechanism; and a columnar drive shaft structured to travel through the longitudinal aperture of the rotational drive mechanism, a first end of the columnar drive shaft including means for connecting to a suction cup and a second end of the columnar drive shaft including means for interacting with one or both of the pair of spiral installation drive members for moving the columnar drive shaft through the longitudinal aperture of the rotational drive mechanism in an outwardly direction relative to the planar drive surface thereof.

According to one aspect of the suction cup holding device, the means of the columnar drive shaft for interacting with the spiral installation drive members of the rotational drive mechanism is structured as a rigid installation drive pin installed crosswise to the columnar drive shaft.

According to another aspect of the suction cup holding device, the means for connecting to a suction cup includes a structure adapted for being molded into the suction cup.

According to another aspect of the suction cup holding device, a suction cup having a central attachment portion is included, the central attachment portion being coupled to the suction cup connecting means of the columnar drive shaft.

According to another aspect of the suction cup holding device, the housing includes a concavity positioned on a surface opposite from the external drive surface thereof and is structured to admit a central flexible portion of a suction cup, the aperture communicating between the external drive surface and the concavity.

According to another aspect of the suction cup holding device, the rotational drive mechanism further includes a pair of diametrically opposed spiral release drive members each projecting inwardly from an internal wall surface of the tubular frame on an opposite surface of the spiral installation drive members and being supported at first and second ends by the pair of diametrically opposed longitudinal stanchions projecting inwardly from the internal wall surface of the tubular frame; and the second end of the columnar drive shaft further includes means for interacting with one or both of the pair of spiral release drive members for moving the columnar drive shaft through the longitudinal aperture of the rotational drive mechanism in a second direction relative to the planar drive surface thereof opposite from the first direction. The means of the columnar drive shaft for interacting with the spiral release drive members of the rotational drive mechanism is, for example, a rigid release drive pin installed crosswise to the columnar drive shaft at a position between the installation drive pin and the means for connecting to a suction cup.

According to another aspect of the suction cup holding device, the housing includes a utilization mounting surface structured as a pattern of mounting holes spaced away from the housing planar drive surface a distance sufficient to admit the rotational drive mechanism therebetween.

Other aspects and objects, features, and advantages of the suction cup holding device will be apparent in the written description which follows.

BRIEF DESCRIPTION OF THE DRAWINGS

The foregoing aspects and many of the attendant advantages of this suction cup holding device will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

The terms "up" and "down" and derivatives are used solely for clarity in describing the suction cup holding device and relate to the relative orientation of the individual components shown in the Figures and the assembly relative to a surface to which it is attached.

The present suction cup holding device apparatus and method includes a compact axial suction cup installation and release mechanism. The suction cup device includes a suction cup within a concave housing, and an axial drive member structured to operate on an external surface of the housing. A drive shaft is coupled to a central portion of the suction cup and extends through an aperture in the housing, projecting above a drive surface axially aligned with the concave surface formed in the housing. The drive shaft extends through a central aperture in the axial drive member and interacts with an inclined drive surface to pull the central portion of the suction cup toward and push it away from the concave surface of the housing when the axial drive member is rotated in first and second opposite directions relative to the housing.

The present suction cup holding device is substantially illustrated, by example and without limitation, in combination with the suction cup holding device disclosed by the present inventor in U.S. Pat. No. 6,666,420 "Suction Cup Having Compact Axial Installation And Release Mechanism" issued Dec. 23, 2003, which is incorporated herein by reference.

Figure 1:
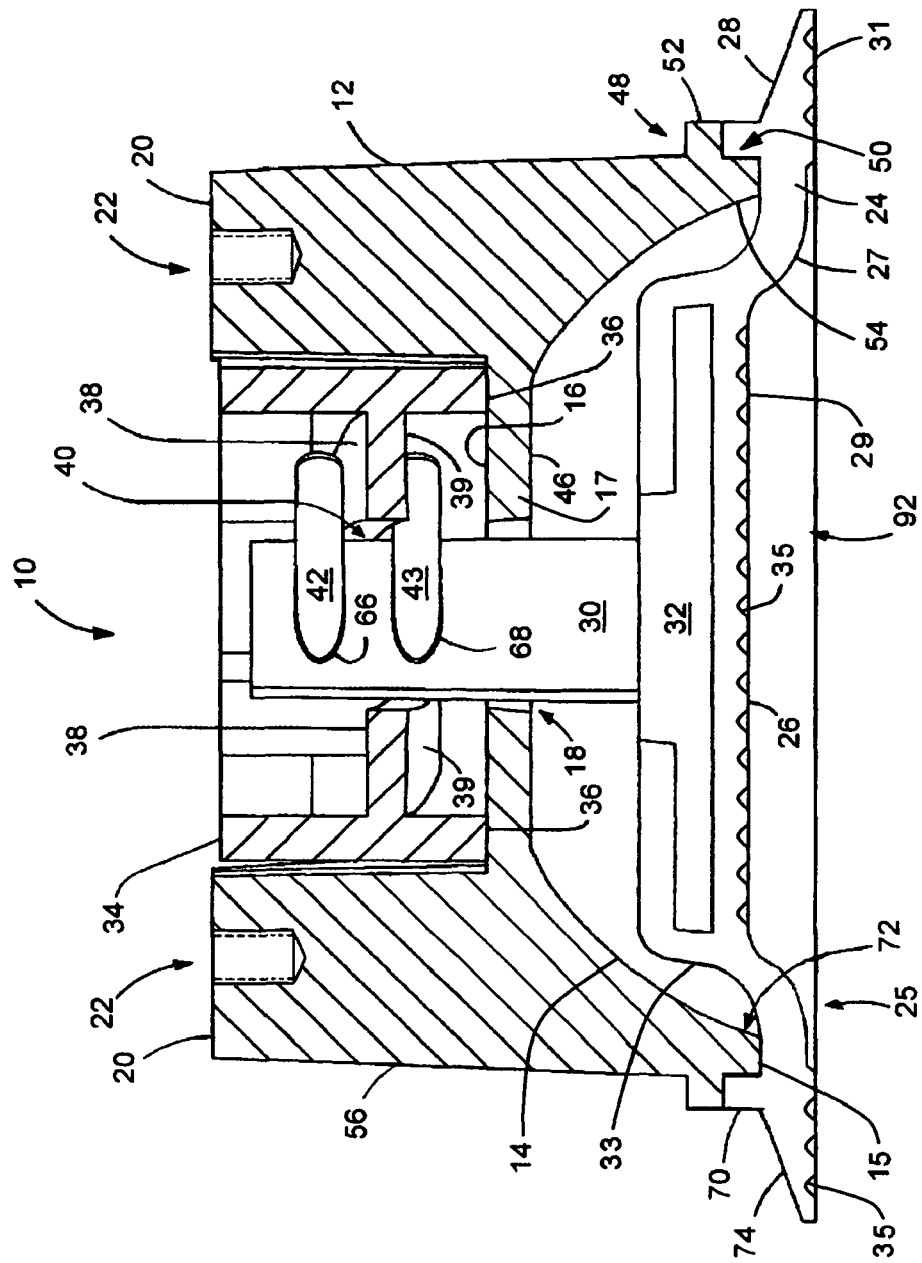
FIG. 1 is a partial cutaway view of the suction cup holding device embodied a suction cup device having a compact axially-driven suction cup installation and release mechanism.

FIG. 1 is a partial cutaway view of an exemplary suction cup holding device 10 having a compact axially-driven suction cup installation and release mechanism. Accordingly, the housing 12 is shown embodied by example and without limitation as having a substantially smooth and flexible concave recess or cavity 14 formed in a first contact surface 15, a relatively stiff reaction drive portion 17 formed with a substantially planar reaction drive surface 16 formed on an opposite external surface of the housing 12 from, and axially aligned with, the concave cavity 14. An axial aperture 18 communicates between the housing drive surface 16 and the concave cavity 14. The suction cup device 10 is structured to secure some device—a "utilization device"—to a surface. Therefore, a utilization mounting surface 20 is provided as a pattern of mounting holes raised above the operational features of the device. According to one embodiment of the suction cup holding device 10, the utilization mounting surface 20 is formed external to the concave cavity 14 and spaced far enough from the housing drive surface 16 to fit the compact axially-driven suction cup installation and release mechanism to fit there between. The utilization mounting surface 20 is formed, by example and without limitation, with a pair of spaced apart threaded mounting holes 22.

A low durometer suction cup 24 is provided having a resiliently deformable central suction portion 25 which is positioned substantially within the concave cavity 14 of the housing 12 and a peripheral lip portion 28 positioned substantially outside of the cavity 14. Optionally, at least a substantially smooth, viscous or tacky inner surface 29 of the deformable central suction portion 25 is formed with a substantially non-slip texture that exhibits a relatively high coefficient of friction. The tacky, high friction material results in a substantially non-slip inner surface 29. Optionally, the peripheral lip portion 28 is formed with a substantially smooth, viscous or tacky contact surface 31. Optionally, each of the deformable central suction portion 25 and the peripheral lip portion 28 is provided with the respective tacky surface 29, 31.

Optionally, the low durometer suction cup 24 is formed with a substantially smooth outer shell surface 33 that is substantially slicker than the opposite tacky inner surface 29. When present, this optional slick outer shell surface 33 slides more easily on the surface of the concave cavity 14.

A drive shaft 30 is sized to pass through the aperture 18 in the housing 12 and includes a thin disk-shaped foot portion 32 that is coupled to the central portion 25 of the suction cup 24.

A spiral rotational drive member 34 is mounted on the drive shaft 30. The rotational drive member 34 is formed having a first substantially planar drive surface 36 that, in operation, drives rotationally against the housing reaction drive surface 16. The rotational drive member 34 is further formed with an pair of upper spiral axial installation drive surfaces 38 that are axially aligned with the first planar drive surface 36 and are relatively inclined at substantially identical angles thereto, and a second pair of spiral axial release drive surfaces 39 are formed on the undersides of the installation drive surfaces 38 and have substantially the identical inclination relative to the housing reaction drive surface 16. A substantially round axial aperture 40 communicates between the planar drive surface 36 and the two inclined drive surfaces 38 and is sized to slidingly accept the axial drive shaft 30 therethrough. Installation and release drive pins 42, 43 are fixed crosswise to the drive shaft 30 and spaced away from the suction cup 24. The installation and release drive pins 42, 43 are structured to interact with the respective installation and release inclined drive surfaces 38, 39 of the axial drive member 30.

The suction cup housing 12 is structured such that the concave cavity 14, or at least the first opening on the surface thereof, effectively conforms to complex curves which may be present in the target surface and forms a seal therewith at relatively lower pressures than are generally effective for suction cup devices. For example, the concave cavity 14 of the suction cup housing 12 is formed of a soft and rubbery elastomeric material of a type having a softness or pliability that renders the concave cavity 14 extremely soft and pliable so that at least the first opening on the surface thereof effectively conforms to complex curves which may be present on target surfaces such as a dash board of a modern automobile.

Conversely, the drive shaft 30 and rotational drive member 34 all may be manufactured easily and inexpensively as individual units of relatively rigid molded plastic. The installation and release drive pins 42, 43 are of a tough and sturdy material such as metal.

Figure 2:
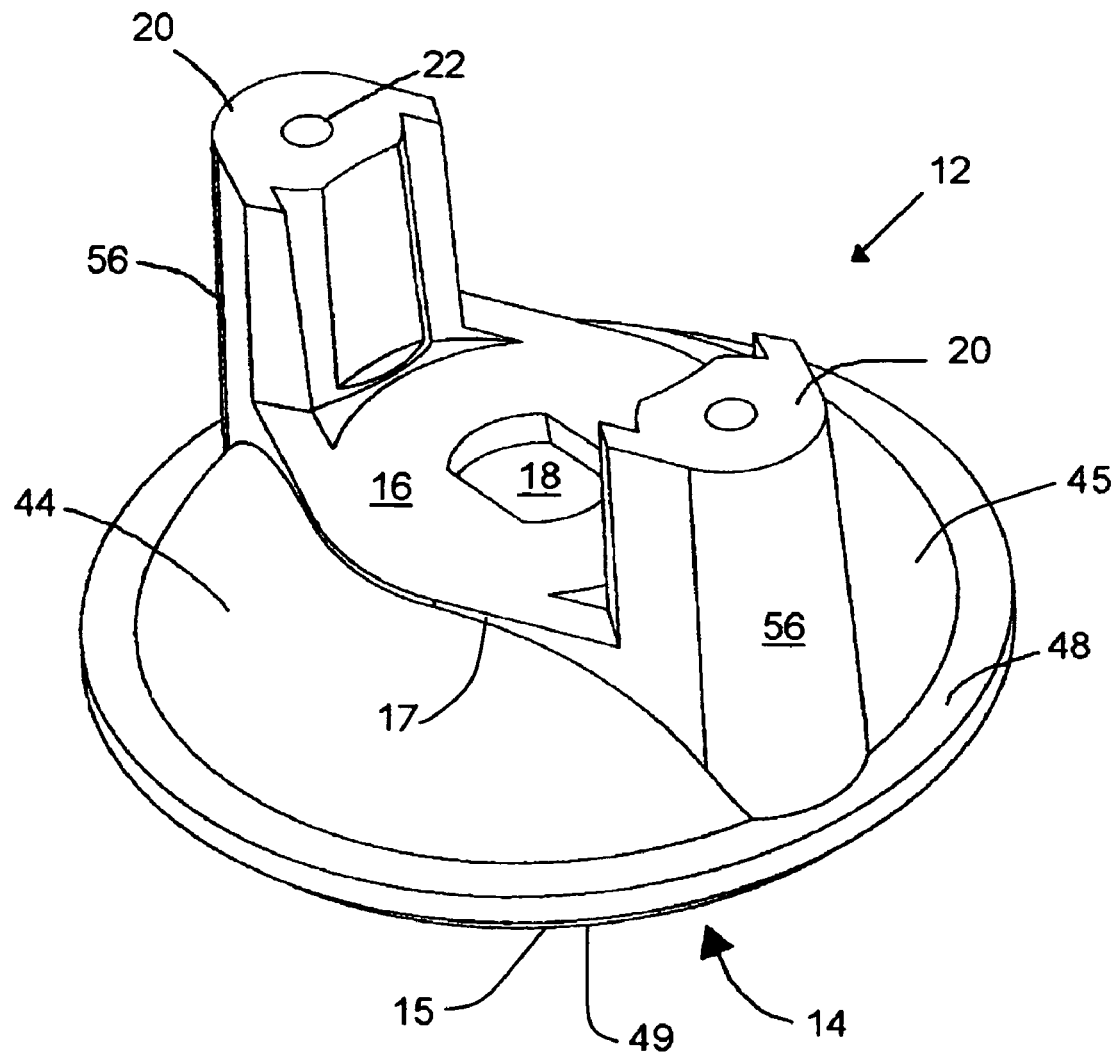
FIG. 2 illustrates the suction cup housing of the suction cup holding device embodied as a shallow "bell" shaped body an under surface of which is formed with a concave cavity structured to cooperate with the suction cup holding device.

FIG. 2 illustrates the suction cup housing 12 embodied by example and without limitation as a shallow "bell" shaped body 44 having a wall 45 forming the flexible concave cavity 14. As is more clearly shown in FIG. 1, the concave cavity 14 is by example and without limitation formed with a shallow semi-spherical shape that is further truncated at its inner surface by the substantially planar underside 46 of the drive surface 16. The concavity 14 is alternatively embodied as a shallow semi-spherical shape that maintains its curvature across the underside 46 of the drive surface 16. According to another alternative embodiment, the concavity 14 is embodied as a shallow "funnel" shape that either maintains its shape to the underside 46 of the reaction drive surface 16, or is truncated at its inner surface by the substantially planar underside 46 of the reaction drive surface 16.

The drive surface 16 is embodied as a substantially planar surface that truncates the semi-spherical exterior of the housing 12 at a position opposite from the concave cavity surface 14 and spaced apart from it by the thickness of the reaction drive portion 17. The drive surface 16 is further axially aligned with the concavity 14. The aperture 18 communicating between the reaction drive surface 16 and its underside 46 within the concavity 14 is structured to limit relative rotation of the drive shaft 30. For example, the aperture 18 is formed as a generally square or rectangular slot, although other anti-rotational shapes may be used such as oblongs, stars, kidneys and free forms. According to one embodiment, the shape of the aperture 18 follows the generally round overall theme of the axially-driven suction cup device 10 having the short sides of the rectangular slot curved or arched substantially concentric with the bell-shaped housing body 44 and the concavity 14 formed therein.

A peripheral lip portion 48 is optionally formed concentrically with the bell-shaped housing body 44 around an opening 49 into the concavity 14. Optionally, the peripheral lip portion 48 is constructed to hold the peripheral lip portion 28 of the suction cup 24 smooth, flat annular ring concentric with the housing body 44 and positioned external to the concavity 14. As is more clearly shown in FIG. 1, the lip portion 48 includes an annular groove 50 between concentric outward and downward projecting portions 52, 54 for capturing a thick and portion of the suction cup lip 28. The downward projecting portion 54 of the housing lip 48 keeps the suction cup lip 28 from being drawn into the concavity 14 during installation of the suction cup device 10, while the outwardly projecting portion 52 helps to keep the suction cup lip 28 from curling.

According to the present embodiment of the suction cup holding device 10, the suction cup housing 12 is formed of a well-known material of a type that is known to be soft and pliable when formed in sections of relatively thin or narrow dimension and increases in stiffness with increased cross-sectional dimension. One example of such a material is a family of thermoplastic polyester elastomers manufactured by DuPont® under the trade name Hytrel®. Such thermoplastic polyester elastomers are a thermoplastic and an elastomer all in one that provide the flexibility of rubbers, the strength of plastics, and the processibility of thermoplastics. Such thermoplastic polyester elastomers can be processed easily by conventional thermoplastic processes, including injection molding, blow molding, calendaring, rotational molding, extrusion and meltcasting. Such thermoplastic polyester elastomers exhibit excellent flex fatigue and provide broad use temperature. These materials are strongly resistant to tearing, flex-cut growth, creep and abrasion, and have mechanical properties that provide strength and stiffness, outstanding toughness, and have chemical properties that make them highly resistant to hydrocarbons and many other fluids. Grades of such thermoplastic polyester elastomers are generally available in a full range of Shore D hardnesses from 30 D to 82 D, and special grades include heat stabilized, flame retardant, and blow molding. Concentrates of such thermoplastic polyester elastomers include black pigments, UV protection additives, hydrolysis resistant additives, heat stabilizers, and flame retardants. Therefore, although the housing 12 is optionally embodied according to multi-part or multi-material components, thermoplastic polyester elastomers provide one simple and efficient example of the housing 12 that effectively substantially conforms the contact surface 15 having the opening 49 into the concavity 14 to complex curves and irregularities which may be present on target surfaces, while the relatively wider and thicker reaction drive portion 17 having the reaction drive surface 16 is stiff enough to cooperate with the compact axially-driven installation and release mechanism for driving the suction cup 24. For example, thermoplastic polyester elastomers permit at least a portion of the wall 45 of the housing body 44, the peripheral lip portion 48, and the concave cavity surface 14 to effectively substantially conform to complex curves and irregularities. However, the relatively wider and thicker portion of thermoplastic polyester elastomers cause the reaction drive portion 17 to be stiff enough that the reaction drive surface 16 effectively cooperates with the compact axially-driven installation and release mechanism for driving the suction cup 24.

Accordingly, the peripheral lip portion 48 of the bell-shaped housing body 44 is substantially soft and pliable for effectively conforming to complex curves which may be present on target surfaces such as a dash board of a modern automobile. The wall 45 of the bell-shaped housing body 44 and concave cavity surface 14 therein may also be substantially soft and pliable for effectively conforming to such complex curves as may be present on the target surface.

The suction cup housing 12 includes the utilization mounting surface 20 formed, for example, as a pair of spaced apart columns 56 diametrically opposed from one another on either side of the drive surface 16 and projecting upwardly from the external surface of the wall 45 of the bell-shaped housing body 44. As illustrated, wall 45 of the bell-shaped housing body 44 is substantially constant in cross-sectional thickness between the peripheral lip portion 48 and the underside 46 of the reaction drive portion 17 opposite from the reaction drive surface 16, except in the pair of diametrically opposed columns 56. The substantially constant cross-section of the wall 45 causes the bell-shaped housing body 44 to be a low durometer such that it is generally flexible up to the underside 46 of the thicker reaction drive portion 17 opposite from the reaction drive surface 16, which permits the wall 45 of the bell-shaped housing body 44 and its peripheral lip portion 48 to effectively conform to complex curves and irregularities which may be present on target surfaces, while the thicker stiff reaction drive portion 17 is stiff enough to have a cooperate with the compact axially-driven installation and release mechanism for driving the suction cup 24.

The columns 56 are formed with thicker cross-sectional area for increasing durometer or stiffness of the housing 12 to support an external object mounted on the utilization mounting surface 20. The columns 56 are sized and shaped to provide sufficient stiffness against side loading expected of the application for which suction cup device 10 is intended. The utilization mounting surfaces 20 are substantially co-planar surfaces formed substantially parallel with the drive surface 16 and disposed on the ends of the columns 56 distal from the housing body 44. Each of the utilization mounting surfaces 20 includes means 22 for attaching thereto. For example, the attaching means 22 are embodied as threaded holes or through holes backed up with embedded or free-floating metal hex nuts or another threaded insert.

Figure 3:
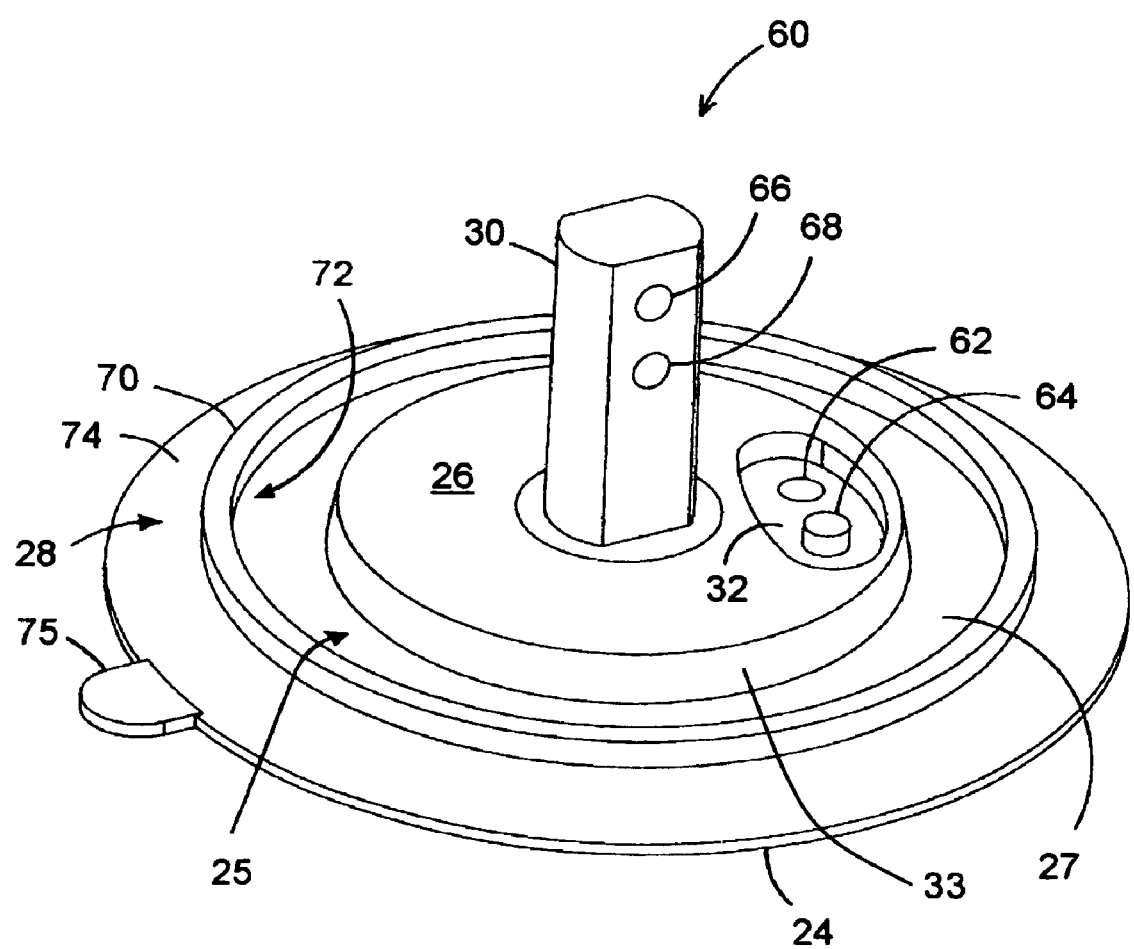
FIG. 3 illustrates the suction cup and drive shaft of the suction cup holding device embodied in a plunger assembly.

FIG. 3 illustrates the suction cup 24 and the drive shaft 30 embodied in a plunger assembly 60. As is more clearly shown in FIG. 1, the drive shaft 30 includes an integral disk-shaped foot portion 32 expanding outwardly from one end of the column-shaped body of the drive shaft 30. The circular foot portion 32 is provided with means 62, 64 for adhering the moldable suction cup material thereto. For example, the adhering means 62, 64 (shown in cutaway) are embodied as a pattern of depressions or holes and short columnar projections, respectively, that may be present individually or in combination (shown). The columnar drive shaft 30 is sized to pass through the aperture 18 in the suction cup housing 12 and is shaped to cooperate with the aperture 18 for maintaining a constant relative rotational orientation, and thus remains rotationally oriented to the suction cup housing 12 during operation. In the example shown, the columnar drive shaft 30 generally rectangular in cross-section and is sized to slidingly engage the aperture 18. The columnar drive shaft 30 also includes one or a pair of spaced-apart crosswise through holes 66, 68 at intervals along its length, the hole 66 more proximate to the distal end of the drive shaft 30 is provided for the installation drive pin 42, while the more distal through hole 68 is provided for the release drive pin 43, as discussed below.

The suction cup 24 is formed of a soft and rubbery elastomeric material of a substantially low durometer type having a softness or pliability that renders the suction cup 24 extremely soft and pliable so that the thin deformably resilient annular portion 27 effectively conforms to complex curves and irregularities which may be present in the target surface. Furthermore, the soft, pliable material permits a vacuum to be drawn in the suction cup 24 even when the target surface is not as smooth and hard as, for example, glass. Rather, the soft, pliable material permits a vacuum to be drawn in the suction cup 24 on soft fabric surfaces such as vinyl and plastic that are yet impermeable to air, such as might be found on target surfaces such as a dash board of a modern automobile. The soft and rubbery elastomeric material of the inner surface 29 of the suction cup 24 may optionally be finished with a high friction "tacky" surface that feels sticky to the touch. The tackiness of such surface finish and high coefficients of both static and kinetic friction of the material of the inner surface 29 prevent the suction cup device 10 sliding over the target surface when it is inclined, shocked, agitated, or otherwise disturbed. The high friction "tacky" surface also causes the inner surface 29 of the suction cup 24 to inherently adhere to the target surface, even when the target surface is a soft fabric surface such as vinyl and plastic dash board material. This inherent stickiness combines with the suction action to more effectively hold the suction cup device 10 to the target surface.

By example and without limitation, the suction cup 24 is formed of a vinyl, silicone rubber, or another elastomeric material which is impervious to air, having a high elastic modulus and high coefficient of friction, thereby significantly increasing the tendency of the tacky inner surface 29 of the suction cup 24 to adhere to the target surface and effectively increasing the holding power of the suction cup device 10. By example and without limitation, the silicone rubber is a composition of an organopolysiloxane gum, a silica filler, and a curing catalyst, as disclosed for example by Gibbons in U.S. Pat. No. 4,580,794 "Silicon Rubber Gasket And Material" issued Apr. 8, 1986, which is incorporated herein by reference.

Alternatively, the silicone rubber is a composition of organopolysiloxane gum, a silica filler material, as organosilicone processing aid, a and texturizing material, as disclosed by A. G. Cavicchioli in U.S. Pat. No. 4,552,713 "Method Of Forming An Improved Handgrip Having Non-Slip Features" issued Nov. 12, 1985, which is incorporated herein by reference. The silicone rubber composition is placed in a suitable mold and cured with a peroxide catalyst to form the suction cup 24.

One optional material may be a methyl vinyl polysiloxane optionally containing a small amount of ground silica filler, for example as disclosed by Stanley Taub in U.S. Pat. No. 5,059,271 "Method Of Supporting And Retaining Surgical Instruments On A Non-Skid Supporting Surface" issued Oct. 22, 1991, which is incorporated herein by reference. As disclosed by Taub, methyl vinyl polysiloxane containing a small amount of ground silica filler can be formed into a thin elastomeric sheet having a high elastic modulus and high coefficient of friction.

The methyl vinyl polysiloxane sheet disclosed by Taub has two sides, one side having a permanently tacky surface and the other side having a textured or embossed surface. The tacky surface is formed during the curing process, which is described in detail by Taub, and not from a sticky adhesive. The tacky surface has high coefficients of both static and kinetic friction, which may be attributable to the tacky quality of the surface.

Due to the surface tackiness and high coefficients of both static and kinetic friction of the material, articles will not slide off a surface when it is inclined (up to about 90 degree slope), agitated, or otherwise disturbed.

As disclosed by Taub, the methyl vinyl polysiloxane sheet material may also be reused since as it can be repeatedly sterilized by any standard technique without losing its properties, particularly its tacky surface property. Thus, the suction cup 24 of the present suction cup holding device 10 is optionally formed from methyl vinyl polysiloxane optionally containing small amounts of ground silica filler. The present suction cup 24 is optionally formed having both the slick second outer shell surface 33, and the smooth inner surface 29 having an inherently tacky surface of the type that is formed when the polysiloxane is cured with the smooth inner surface 29 exposed to air, and having relatively high kinetic and static coefficients of friction.

Another optional material is disclosed by Imran in U.S. Pat. No. 5,331,959 "Low impedance, low durometer, dry conforming contact member" issued Jul. 26, 1994, which is incorporated herein by reference. Thus, the suction cup 24 is optionally formed of a conductive silicone that, when cured or polymerized is characterized in that it is dry with no free H2O additive and is very soft. The material is nonconducting and has a tacky surface to the touch. As disclosed by Imran, one silicone found to be particularly suitable for use in forming a device that is very soft with a tacky surface such as the present suction cup 24 is optionally a two-component or two-part system, low viscosity liquid silicone gel manufactured by General Electric Company Silicone Products, Waterford, N.Y., identified as an RTV 6157 silicone gel, which cures at room temperature with an appropriate ratio of a curing agent. A softer gel having adhesive qualities is optionally obtained by using less curing agent to optimize the stickiness with which the suction cup 24 is retained on the mounting surface. Such two-component or two-part system, low viscosity liquid silicone gel is free of solvents and is substantially transparent. The cured gel disclosed by Imran permits a mechanical penetration of 8 mm with a Universal Penetrometer having a 69.5 gram aluminum shaft.

In U.S. Pat. No. 4,078,128 "Process For Rendering Ethylene-Vinyl Acetate Copolymers Agglomeration-Resistant" issued Mar. 7, 1978, which is incorporated herein by reference, Hoyt, et al. discloses that it is well known in the art that various polymers are tacky and, when in particulate form, tend to block and stick together during storage. For example, Hoyt, et al. point out that, in U.S. Pat. No. 3,753,965, which is incorporated herein by reference, it is disclosed that ethylene-acrylic acid copolymers in the particulate form, especially those copolymers containing at least 10% by weight of acrylic acid, tend to block and stick together when warm and under the pressure generated by the weight of the copolymer in storage. This reference teaches that it is possible to render the particles less prone to blocking and sticking by treating them with a base until as little as 2.5% by weight of the carboxyl groups on the particle surfaces are converted to the corresponding salt groups.

In another example, Hoyt, et al. point out that it is also known that high molecular weight EVA (Ethylene-Vinyl Acetate) polymers which contain substantially more than about 35% by weight of VA up to about 60% by weight of VA are tacky, pelletizable copolymers, form pellets that not only stick together when warm or under the pressure generated by the weight of the resin in storage, as is observed in the case of the ethylene-acrylic acid copolymer, but also, at the higher VA contents within the range, readily stick together even at room temperature, soon after they are pelletized, to produce agglomerated bodies that eventually may aggregate further until they form a single, relatively coherent mass which takes on the shape of the container in which they are stored. Additionally, Hoyt, et al. points out that EVA copolymers which contain more than about 60 weight percent VA can not be pelletized by conventional means because the pellets thereof immediately coalesce upon formation to produce a substantially homogeneous mass of resin in which pellet-boundaries can scarcely be distinguished. Hoyt, et al. refers to such EVA copolymers as tacky, non-pelletizable EVA copolymers. Thus, Ethylene-Vinyl Acetate copolymers are known to be tacky in many forms.

In another example, Estes discloses another optional vinyl material in U.S. Pat. No. 5,661,208 "Rubber And Vinyl Protectant" issued Aug. 26, 1997, which is incorporated herein by reference. For example, Estes discloses that the surface 29 of a suction cup 24 formed of a rubber or vinyl material and having thereon a surface protectant containing only an acrylic component in its formulation, is glossy and feels dry to the touch but is also tacky and draggy as if a heavy residue was present.

Optionally, the tacky inner surface 29 is texturized. For example, when the suction cup is vinyl, the inner surface 29 is buffed such that the exterior surface of said handgrip to fracture the exposed portions of said hollow spheres and thereby presents a roughened exterior surface. In another example, a large number of micro-pores 35 may be distributed across one or both of the tacky inner surface 29 and the tacky peripheral contact surface 31. The micro-pores 35 may be formed by a large quantity of micro-hemispheres projected above a surface of a mold where the tacky inner surface 29 is formed. The micro-hemispheres on the mold surface imprint the micro-pores 35 on the tacky inner surface 29 as hollow hemispheres or at least semispheres. Such hollow hemispherical or semispherical micro-pores 35 may be otherwise formed in the tacky inner surface 29 of the suction cup 24. For example the hollow hemispherical or semispherical micro-pores 35 may be formed by impregnating the surface 29 with microspheres of a material that is later dissolved or otherwise removed leaving the hollow hemispherical or semispherical micro-pores 35. Each of the large quantity of hollow hemispherical or semispherical micro-pores 35 operates independently as a mini-suction cup that mechanically increases the frictional qualities of the tacky inner surface 29 of the suction cup 24.

The vinyl, silicone rubber, or other elastically resilient elastomeric material is molded over the circular foot portion 32 of the drive shaft 30, as is more clearly shown in FIG. 1. The adhering means 62, 64 to improve and ensure adhesion of the molded suction cup material to the drive shaft foot portion 32. The central suction portion 25 of the suction cup 24 includes a relatively stiff round center section 26 formed of the elastically resilient material over molding the foot 32 of the drive shaft 30. The relatively stiff round center section 26 is surrounded by an integral thin deformably resilient annular portion of that extends to the integral peripheral lip portion 28. According to one embodiment of the suction cup holding device 10, the peripheral lip portion 28 is an annular ring of the elastically resilient material structured to cooperate with the annular groove 50 of the housing body's lip 48 for keeping the peripheral lip 28 from being drawn into the concavity 14 during installation of the suction cup device 10. Accordingly, the lip portion 28 includes a thickened inner peripheral annular ring 70 that forms an annular "shelf" 72 structured to fit within the annular groove 50 between outwardly and downwardly projections 52, 54. The integral peripheral lip 28 may extend outwardly in a thickened annular ring portion 74 having a cross-section of sufficient thickness to avoid curling during installation of the suction cup device 10, thereby effectively increasing the suction cup footprint and the holding power of the suction cup device.

The softness or pliability of the vinyl, silicone rubber, or other elastically resilient elastomeric material in turn renders the suction cup 24 extremely soft and pliable so that the thin deformably resilient annular portion 27 of the suction cup 24 is able to effectively conform to complex curves which may be present in the target surface.

The optional slick second outer shell surface 33 of the suction cup 24 slides easily on the surface of the concave cavity 14 so that the suction portion 25 is more easily withdrawn into the concavity 14 of the housing 12.

A tab 75 extends from the periphery of the annular ring portion 74 of the suction cup 24. When the suction cup is attached to a surface, manual lifting of the tab 75 by the operator eases release of the suction cup device 10.

Although perhaps less effective in operation than a rigid material, the drive shaft 30 is optionally molded of the same material from which the suction cup 24 is molded. Additionally, when molded of the same material as the suction cup 24, the drive shaft 30 is optionally molded integrally with the suction cup 24, and the foot portion 32 is eliminated.

Alternatively, the suction cup 24 is glued or otherwise adhered to the foot portion 32 of the drive shaft 30.

Figure 4:
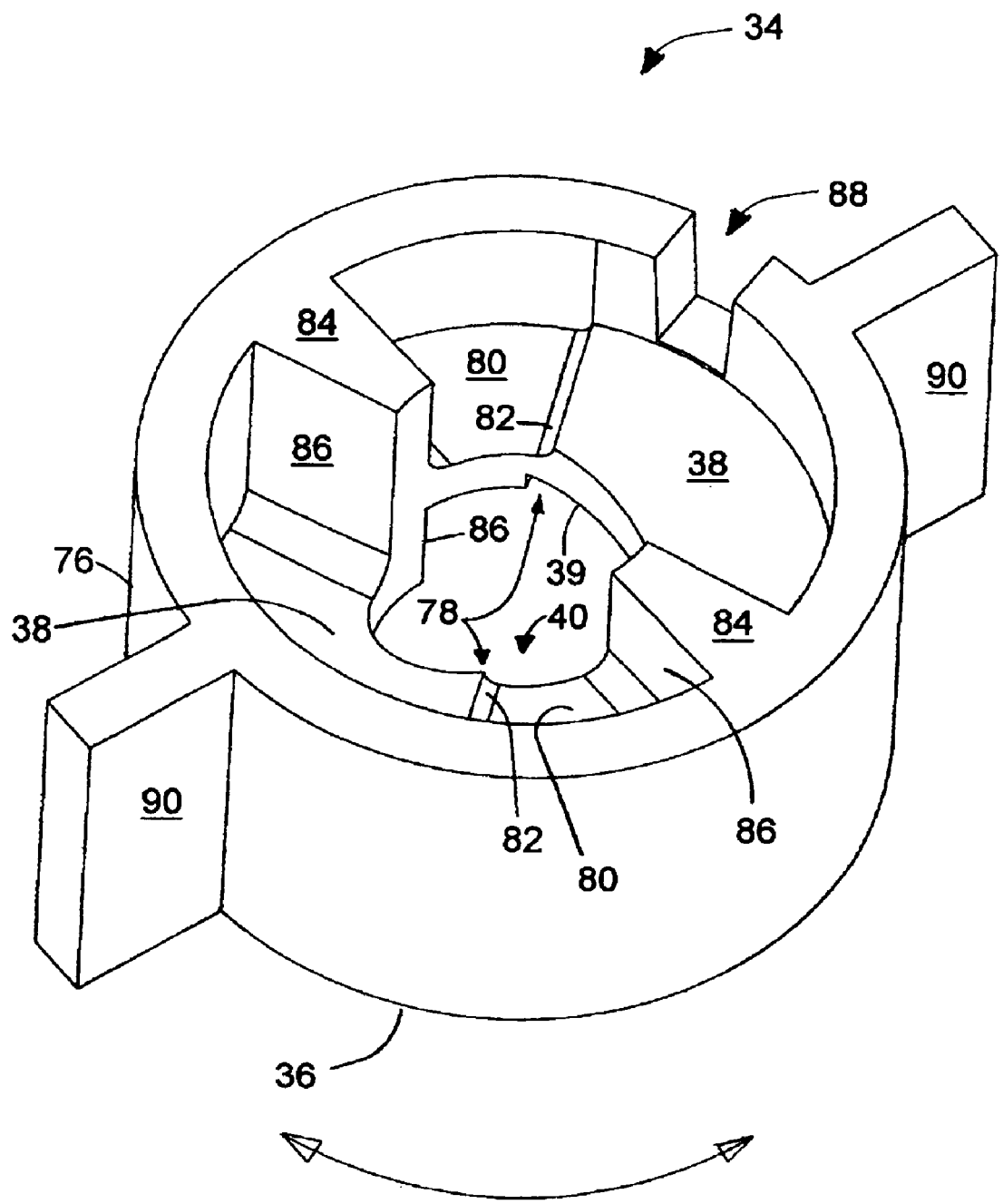
FIG. 4 illustrates one embodiment of the spiral axial drive member of the suction cup holding device that is mounted on the drive shaft illustrated in FIG. 1.

FIG. 4 illustrates one embodiment of the spiral axial drive member 34 that is mounted on the drive shaft 30 in FIG. 1. As embodied in FIG. 4, the axial drive member 34 includes the substantially planer drive surface 36 embodied as an annular ring formed as one surface of a substantially tubular-walled body or frame 76 that is its main structural component. In the top-down perspective view of FIG. 1 the pair of upper spiral axial installation drive surfaces 38 are shown as a pair of diametrically-opposed annular inclined surfaces around the round axial aperture 40. The installation drive surfaces 38 are offset above respective spiral axial release drive surfaces 39 and cover a vertical distance relative to the tubular walls of the frame 76 that is configured to create a substantial vacuum between the deformable central portion 25 of the suction cup 24 and a surface to which it is attached. The lower release drive surfaces 39 begin at a minimum position relative to the frame walls 76 that is offset above the planar drive surface 36 sufficiently to permit the release drive pin 43 to pass thereunder, as is more clearly shown in FIG. 1.

The spiral installation drive surfaces 38 are provided with anti-rotation "keeper" means 78. For example, the spiral installation drive surfaces 38 extend at their maximum elevation relative to the planar drive surface 36 in an extension or "shelf" portion 80 that is formed either substantially parallel with the planar drive surface 36 or canted at a slightly negative inclination relative to the respective installation drive surfaces 38. A "saddle" is optionally created by a shallow curve or "dish" shaped in shelf to operate as the anti-rotation locking mechanism. Irrespective of configuration, the installation drive and 42 rests on the shelf portion 80. A detent 82 is optionally formed between each installation drive surface 38 and the respective extension 80 as an offset or a steeply negatively inclined plane (shown).

The pairs of spiral installation and release drive surfaces 38, 39 end in a pair of stanchions 84 diametrically opposed across the axial aperture 40. Besides supporting the upper and lower ends of the installation and release surfaces, the stanchions 84 provide stops in the form of solid surfaces 86 for one or both of the installation and release drive pins 42, 43.

The rotational drive member 34 includes access means 88 for installing the installation drive pin 42 during assembly of the suction cup device 10 and its installation and release mechanism. For example, the access means 88 is embodied as a slot through the tubular wall of the frame 76 sized to pass the installation drive pin 42. The access slot 88 is positioned along the inclined installation drive surface 38 and a point adjacent to or actually in alignment with the extension 80 at the top of one of the installation drive surfaces 38 distal from the planar drive surface 36.

Additionally, the rotational drive member 34 includes operating means 90 for gripping and manually rotating it about its longitudinal axis, as indicated by the arrow, relative to the suction cup housing 12, whereby the inclined installation and drive surfaces 38, 39 are rotated relative to the respective rotationally fixed installation and release drive pins 42, 43 and the drive shaft 30 is driven-axially relative to the rotational drive member 34. The operating means 90 is embodied for example as a pair of diametrically opposed flanges projecting outwardly from the tubular-walls of the frame 76, as illustrated in FIG. 4. Alternatively, the operating means 90 is embodied as another conventional manual gripping device or surface such as a knurled or grooved surface.

Figure 5:
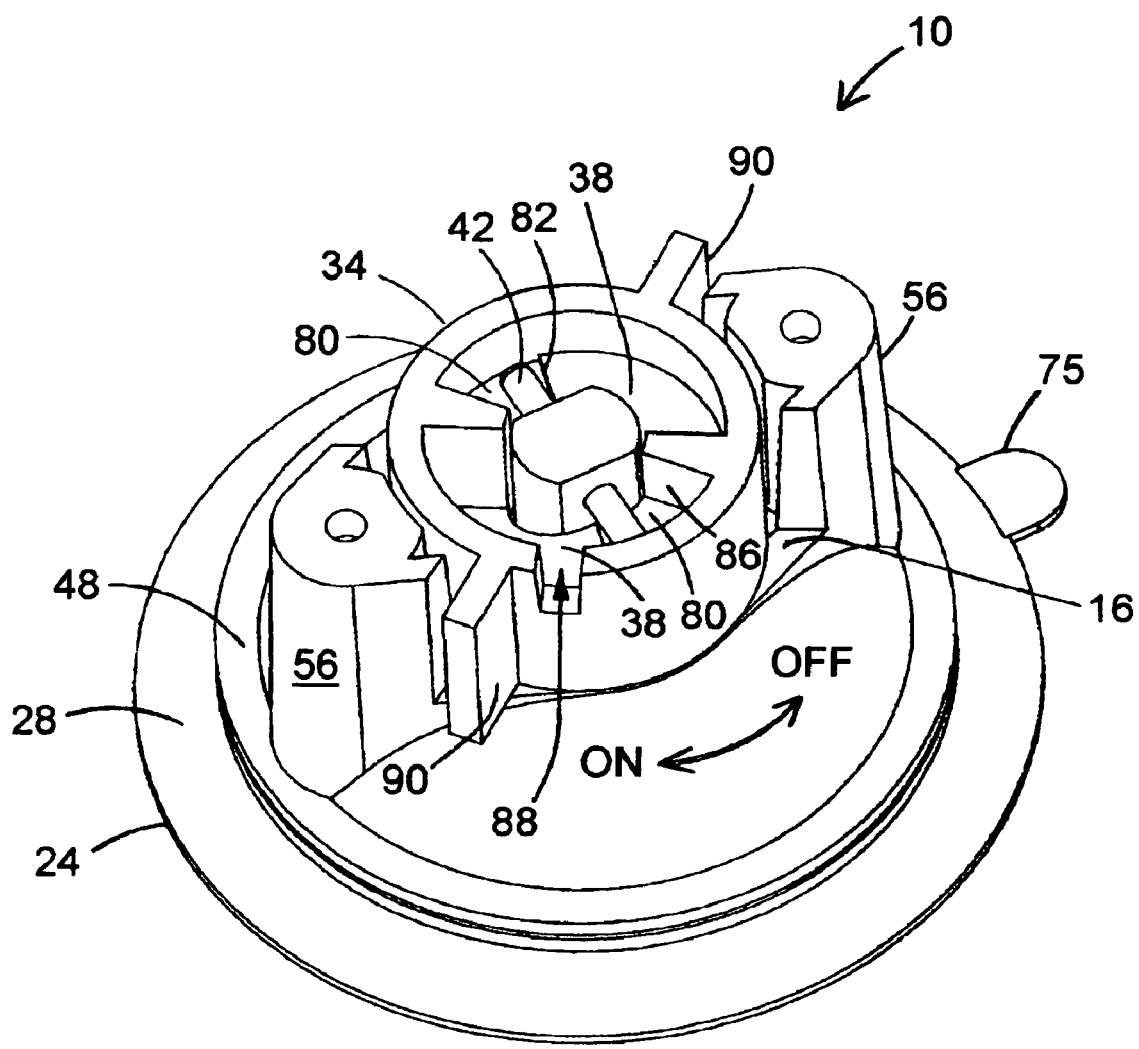
FIG. 5 illustrates the suction cup holding device for describing the assembly and operation of the suction cup holding device.

FIG. 5 illustrates the suction cup device 10, with the utilization of mounting surface 20 exposed. The illustration of FIG. 5 is useful in describing the assembly and operation of the suction cup device 10, including its compact axial suction cup installation and release mechanism. As illustrated, the suction cup 24 is installed with the deformable central suction portion 25 positioned within the concavity 14 of the housing 12, as more clearly shown in FIG. 1, and the peripheral lip portion 28 extending beyond the portion 48. As is also more clearly shown in FIG. 1, the columnar drive shaft 30 passes through the cooperating axial aperture 18 communicating between the interior surface 46 of the cavity 14 and the planar drive surface 16 of the suction cup housing 12.

If present, the release drive pin 43 is inserted into and partially through the more distal hole 68 through the drive shaft 30.

The round axial aperture 40 of the rotational drive member 34 is fitted over the end of the columnar drive shaft 30 projecting through the axial aperture 18 above the housing drive surface 16. The release drive pin 43 fitting between the tubular walls of the axial drive member frame 76. The respective pairs of inclined installation and release drive surfaces 38, 39 are thereby positioned on opposite sides of the drive shaft 30 with each of the release drive surfaces 39 in proximity to the portion of the release drive in projecting crosswise from opposite sides of the drive shaft 30. The planar drive surface 36 is positioned adjacent to and in contact with the housing reaction drive surface 16, as is more clearly shown in FIG. 1. The access means, slot 88, is aligned with the second crosswise hole 66 through the distal end of the drive shaft 30.

When the suction cup 24 is in a relaxed state, the positioning of the access slot at or near the top of the inclined installation drive surface 38 causes the second crosswise hole 66 in the drive shaft 30 to be slightly below the installation drive surfaces 38 of the axial drive member 34. It is therefore partially obscured and inaccessible. A slight pressure is applied to the center section 26 of the suction cup 24, and thereby to the foot portion 32 of drive shaft 30. The drive shaft 30 is thereby moved axially relative to the housing 12 and the axially-driven rotational drive member 34 so that the second crosswise hole 66 appears above the installation drive surfaces 38. The installation drive pin 42 is now passed through the slot 88 and is inserted into and partially through the hole 66 through the drive shaft 30. During assembly, the installation drive pin passes completely through the access slot 88 and thereafter fits between the tubular walls of the axial drive member frame 76. Upon release of the pressure against the suction cup center section 26, the resilient suction cup 24 attempts to return to its relaxed state. The drive shaft 30 is thereby pulled back through the axial aperture 40 in the rotational drive member 34 and the axial slot 18 in the housing 12, which generates a slight pressure between the installation drive pin 42 and the installation drive surfaces 38. This pressure effectively keeps the installation drive pin 42 from backing out of the hole 66 and through the access slot 88. However, as the rotational drive member 34 is rotated to a release position, as discussed below, the installation drive pin 42 moves along the installation drive surfaces 38 downward relative to the rotational drive member 34, which releases the pressure and permits the suction cup 24 to return to its relaxed state.

In operation, with the rotational drive member 34 rotated to release pressure between the installation drive pin 42 and the inclined installation drive surface 38, the peripheral lip portion 28 of the relaxed suction cup 24 is placed against a substantially smooth target surface to which is to be attached. When the operator is satisfied with the position of the suction cup device 10 relative to the attachment surface, the torque load is applied via the flanges 90 to rotate the drive member frame 76 relative to the suction cup housing 12 in the installation direction indicated by the arrow marked "ON." During rotation, the installation drive pin 42 comes into contact with a upwardly ramping axial installation drive surfaces 38. Continued application of the torque load to the drive member frame 76 causes the installation drive pin to travel upwardly along the axial installation drive surfaces 38. The planar drive surface 36 forming the bottom surface of the axial drive member 34 is as is simultaneously rotated against the housing reaction drive surface 16. As the installation drive pin 42 travels upwardly along the installation drive surfaces 38, it is moved axially away from the housing reaction drive surface 16. The drive shaft 30 is simultaneously drawn upwardly through axial aperture 18 in the housing drive surface 16. The foot portion 32 is carried upwardly as part of the drive shaft 30. The center section 26 of the suction cup 24 to his drawn up for delay with the foot portion 32 into the concavity 14 while the peripheral housing lip 48 maintains a manual or shape and position of the suction cup peripheral lip 28 external to the concavity 14. In effect, motion of the installation drive pin 42 upwardly along the installation drive surfaces 38 pulls the drive shaft 30 of the plunger 60 and out of the concavity 14 through the axial aperture 18 in the housing reaction drive surface 16. As the links of the plunger drive shaft 30 increases above the housing drive surface 16, the portion within the concavity 14 shortens. The thin deformably resilient annular portion 27 of the suction cup 24 is forced to stretch between the withdrawing center section 26 positionally fixed peripheral lip 28. An airtight cavity 92 (shown in FIG. 1) is formed beneath the suction cup wherein a partial vacuum is formed relative to ambient atmospheric pressure.

Rotation of the axially-driven drive member 34 ceases when the installation drive pin encounters the solid surface 86 of one or both of the stanchions 84. Other rotational stops may also be provided such as the flanges 90 encountering one of the columns 56 bearing the utilization mounting surfaces 20.

The pressure exerted by the installation drive pin 42 is maintained by its spaced apart position relative to the housing reaction drive surface 16. This relative position is maintained by the anti-rotation keeper means 78, whereby the installation drive pin 42 is settled on the extension or step portion 80 at maximum elevation relative to the housing drive surface 16. Passing the installation drive pin 42 over the optional detent 82, as well as the tension generated in the suction cup 24, ensures that the installation drive pin 42 cannot back down the installation drive surfaces 38.

The suction cup device 10 is released from the attachment surface by release of the relative vacuum within the suction cup 24. This is accomplished by collapsing the airtight cavity 92 by driving the center 26 of the suction cup 24 downwardly to the attachment surface, whereby tension in the stretched deformably resilient annular portion 27 is released and the suction cup 24 returns to its relaxed condition. The center 26 of the suction cup 24 is driven downwardly by interaction of the release drive pin 43 with the release drive surfaces 39 when the torque load is applied to rotate the drive member 34 in a release direction, as indicated by the arrow marked "OFF." For example, a released torque load is applied to the flanges 90 of the drive member frame 76. Force by the release drive pin 43 moving downwardly along the release drive surfaces 39 combines with the elasticity of the stretched deformably resilient annular portion 27 material to push the plunger drive shaft 30 down through the axial aperture 18 into the concavity 14. When the upward force on the plunger drive shaft 30 is completely removed and the suction cup 24 is relaxed, the relative vacuum holding the suction cup device 10 against the attachment surface is released and the device 10 can be moved.

Figure 6:
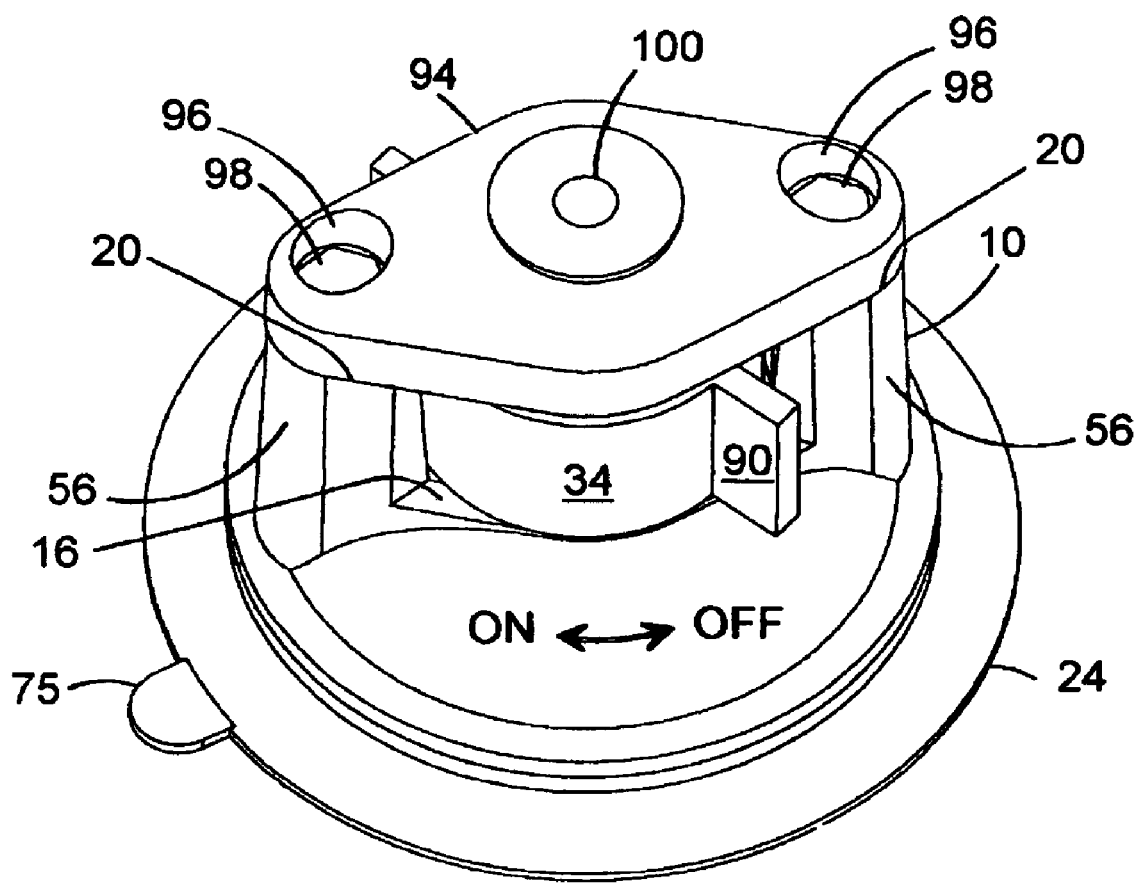
FIG. 6 illustrates the suction cup holding device having a device mounting structure installed on a utilization mounting surface thereof.

FIG. 6 illustrates the suction cup device 10 having a device mounting structure 94 installed on the utilization mounting surfaces 20. The device mounting structure 94 includes means for attaching to the utilization mounting surfaces 20. For example, counter-bores and through holes 96 are provided for a fastener 98 to be threaded to the nut or insert provided at the mounting holes 22. The device mounting structure 94 includes, by example and without limitation, device mounting means such as a threaded or other capture hole 100.

The two-hole diamond shape of the device mounting structure 94 illustrated is not intended to be exhaustive and is shown as only one example and without limitation. The device mounting structure 94 is optionally embodied in any useful configuration. For example, the device mounting structure 94 is embodied suitably for mounting the resiliently compressible ball-shaped coupler described in U.S. Pat. No. 5,845,885, entitled UNIVERSALLY POSITIONABLE MOUNTING DEVICE, issued Dec. 8, 1998, to the present inventor, which is incorporated herein by reference. Alternatively, the device mounting structure 94 is embodied suitably for mounting the wheel-and-axle assembly of the positively-positionable mount described in allowed U.S. patent application Ser. No. 09/855,162, entitled POSITIVELY-POSITIONABLE MOUNTING APPARATUS, filed May 14, 2001, in the name of the present inventor, which is incorporated herein by reference.

According to another alternative, the device mounting structure 94 is embodied suitably for mounting either of the male and female mounting bases for use in combination with the flexible snap-link apparatus disclosed by the present inventor in U.S. patent application Ser. No. 09/654,245, entitled FLEXIBLE ELECTRONIC MOUNT APPARATUS, filed Sep. 2, 2000, which is incorporated herein by reference. Other alternative embodiments of the device mounting structure 94 are also contemplated for mounting a variety of different useful devices.

While one embodiment has been illustrated and described, it will be appreciated that various changes can be made therein without departing from the spirit and scope of the suction cup holding device.

What is claimed is:

1. A suction cup holding device comprising:
   a housing having a recess therein with an opening formed in a first surface, a first portion of the housing adjacent to the first surface being substantially flexible and a second substantially inflexible portion thereof being structured for mounting thereto;

a suction cup having an average low durometer with a resiliently deformable central portion having a tacky inner surface and being structured to be drawn into the recess of the housing;

a suction cup drive shaft coupled to the central portion of the suction cup; and means for drawing the central portion of the suction cup into the recess, wherein the means for drawing the central portion of the suction cup into the recess further comprises means for operating against the second substantially inflexible portion of the housing for moving the suction cup drive shaft relative thereto.

2. The device of claim 1 wherein the second substantially inflexible portion of the housing is positioned distal from the first surface.

3. The device of claim 1 wherein the suction cup is further structured for conforming to a continuous non-planar target contact surface comprising a plurality of differently curved surfaces and sealing thereto.

4. The device of claim 1 wherein the housing further comprises a wall portion forming the recess and the opening in the first surface, a first portion of the wall portion adjacent to the first surface having a first cross-section; and the second substantially inflexible portion of the housing having a different second cross-section that is thicker than the first cross-section.

5. The device of claim 4 wherein the housing further comprises a thermoplastic polyester elastomer.

6. The device of claim 1 wherein the second substantially inflexible portion of the housing is positioned distal from the first surface and substantially aligned with the opening therein and is formed with an aperture communicating with the recess and being sized to pass the suction cup drive shaft there through.

7. A suction cup holding device comprising:

a housing having a recess therein with an opening formed in a first surface, a first portion of the housing adjacent to the first surface being substantially flexible and a second substantially inflexible portion thereof being structured for mounting thereto;

a suction cup having an average low durometer with a resiliently deformable central portion having a tacky inner surface and being structured to be drawn into the recess of the housing, wherein at least a portion of the suction cup further comprises a substantially non-slip surface facing away from the housing; and means for drawing the central portion of the suction cup into the recess.

8. The device of claim 7 wherein the substantially non-slip surface of the suction cup further comprises a surface having a relatively high elastic modulus and relatively high coefficient of friction.

9. A suction cup device having a compact axial installation and release mechanism, the suction cup device comprising:

a housing having a recess formed in a first surface, a drive surface external to and aligned with the recess, an aperture communicating between the housing drive surface and the recess, a portion between the first surface and the drive surface being relatively more flexible than the drive surface, and a relatively stiff utilization mounting surface;

a suction cup formed of a resiliently deformable material having a substantially low average durometer;

a drive shaft coupled to a central portion of the suction cup and being sized to pass through the aperture in the housing;

a rotational drive member having a cooperating drive surface structured to cooperate with the housing drive surface, a spiral installation drive surface aligned with the cooperating drive surface and relatively inclined thereto, and an aperture communicating between the cooperating and spiral installation drive surfaces and being sized to slidingly engage the drive shaft; and an installation drive pin fixed crosswise to the drive shaft and spaced away from the suction cup, the installation drive pin being structured to interact with the spiral installation drive surface of the rotational drive member.

10. The suction cup device of claim 9 wherein the suction cup further comprises a substantially non-slip surface opposite from the drive shaft.

11. The suction cup device of claim 10 wherein the suction cup further comprises a vinyl, silicone rubber, or other elastomeric material being substantially impervious to air and wherein the substantially non-slip surface further comprises a portion of the material having a substantially high elastic modulus and substantially high coefficient of friction.

12. The suction cup device of claim 9 wherein the spiral installation drive surface of the rotational drive member further comprises a pair of diametrically opposed spiral installation drive surfaces; and the installation drive pin is further structured to interact with one or both of the spiral installation drive surfaces of the rotational drive member.

13. The suction cup device of claim 9 wherein the rotational drive member further comprises a spiral release drive surface formed opposite and spaced away from the spiral installation drive surface and inclined substantially similarly to the drive surface; and further comprising a release drive pin fixed crosswise to drive shaft between the installation drive pin and the suction cup and being spaced away from the installation drive pin more than a distance between the spiral installation and release drive surfaces of the rotational drive member, the release drive pin being structured to interact with the spiral release drive surface of the rotational drive member.

14. The suction cup device of claim 9 wherein the spiral installation drive surface further comprises a means structured to interact with the installation drive pin for maintaining a position of the installation drive pin relative to the spiral installation drive surface.

15. The suction cup device of claim 9 wherein the housing further comprises a housing formed of a thermoplastic polyester elastomer, the portion between the first surface and the drive surface being relatively narrower in cross-section than a portion of the housing having the drive surface.

16. A suction cup holding device having a compact installation mechanism, the device comprising:

a housing having a relatively flexible housing body forming therein a relatively wide and shallow concavity formed therein and forming a first opening on the surface thereof, a relatively stiff reaction drive portion aligned with the concavity and having an external reaction drive surface formed thereon and being axially aligned with the concavity, and a second opening communicating between the concavity and the external reaction drive surface;

a plunger having a drive shaft coupled at one end to a suction cup formed of a substantially low durometer resiliently deformable material and having a resiliently deformable portion sized to cooperate with the housing concavity and an integral peripheral lip portion sized larger than the first opening, the resiliently deformable portion of the suction cup being installed substantially within the housing concavity with the peripheral lip portion projecting beyond the first opening thereof, and the plunger drive shaft being engaged with the second opening between the concavity and the reaction drive surface with a distal portion of the plunger drive shaft projecting external to the concavity and beyond the reaction drive surface;

a rotational drive member having a first drive surface structured to cooperate with the housing reaction drive surface and an annular installation drive surface inclined relative to the first drive surface and forming a substantially round central passage therethrough sized to admit the plunger drive shaft and rotate relative thereto; and means engaged between the distal portion of the plunger drive shaft and the annular installation drive surface for drawing the plunger drive shaft outwardly through the second opening in the housing when the rotational drive member is rotated in a first direction relative to the external reaction drive surface.

17. The suction cup holding device of claim 16 wherein the suction cup further comprises a substantially non-slip surface opposite from the drive shaft.

18. The suction cup of claim 16, further comprising means for retaining the plunger drive shaft in fixed rotational orientation relative to the housing during operation of the rotational drive member.

19. The suction cup of claim 16 wherein the rotational drive member further comprises an annular release drive surface longitudinally offset from the annular installation drive surface toward the first drive surface and relatively inclined thereto; and further comprising means engaged between the distal portion of the plunger drive shaft and the annular release drive surface for driving the plunger drive shaft inwardly through the second opening in the housing when the rotational drive member is rotated in a second counter-direction relative to the housing reaction drive surface.

20. The suction cup of claim 16 wherein the rotational drive member further comprises means for securing the plunger drive shaft in fixed rotational orientation to the annular installation drive surface.

21. The suction cup of claim 16 wherein the annular installation drive surface further comprises a pair of annular installation drive surfaces diametrically opposed across a central passage housing further comprises a housing formed of a thermoplastic polyester elastomer, the relatively flexible housing body of the housing being relatively thinner in cross-section than the relatively stiff reaction drive portion.

* * * * *